United States Patent Office 3,836,654
Patented Sept. 17, 1974

3,836,654
COMPOSITION CONTAINING HEXETIDINE AND 2-METHYL-2-NITRO-1,3-DIMORPHOLINOPROPANE
Edward B. Hodge, Terre Haute, Ind., assignor to Commercial Solvents Corporation, Terre Haute, Ind.
No Drawing. Filed Apr. 12, 1973, Ser. No. 350,426
Int. Cl. A61k 27/00
U.S. Cl. 424—248                3 Claims

ABSTRACT OF THE DISCLOSURE

A composition consisting essentially of 5-amino-1,3-bis (2-ethylhexyl) - 5 - methyl-hexahydropyyrimidine and 2-methyl-2-nitro-1,3-dimorpholinopropane in about a 1:1 ratio by weight. The composition is useful as a therapeutic agent when applied topically to the infected tissues of an animal at a concentration of 1–2% in a lotion, cream or ointment.

BACKGROUND OF THE INVENTION

This invention relates to a composition of antimicrobial agents. In a particular aspect this invention relates to an anti-microbial composition useful for topical application to animals suffering from an accessible infection.

5-Amino-1,3-bis(2-ethylhexyl) - 5 - methyl-hexahydropyrimidine—also known by the generic name hexetidine—was disclosed by M. Senkus, in U.S. Pat. 2,387,043. Its use as an anti-microbial agent was disclosed in U.S. Pats. 2,837,463 and 3,072,529. 2-Methyl-2-nitro - 1,3 - dimorpholinopropane, also known as P–1483, is the reaction product of nitroethane, morpholine and formaldehyde in a mole ratio of about 1.0:1.3:1.3. E. B. Hodge, U.S. Pat. 3,054,748 disclosed that this compound was effective against *Desulfovibrio desulfuricans* in secondary oil recovery and in U.S. Pat. 3,192,163, he disclosed that the compound was an effective bacteriostatic agent in petroleum-containing lubricants such as cutting oils.

SUMMARY OF THE INVENTION

It is an object of this invention to provide an anti-microbial composition suitable for animals.

It is another object of this invention to provide an anti-microbial composition useful for topical application.

Other objects will be apparent to those skilled in the art from description herein.

It is the discovery of this invention that hexetidine and P–1483 form a highly effective anti-microbial combination in about a 1:1 by weight mixture. The combination is effective against both Gram-positive and Gram-negative bacteria and fungi.

DETAILED DISCUSSION

The combination of the present invention is effective by topical application to the skin of animals suffering from an infection due to an organism susceptible to the combination. Surprisingly, the combination is considerably more effective against some organisms than either component alone. The combination can be applied as a 0.5–5% by weight dispersion in a suitable vehicle, e.g. as an emulsified lotion or cream or, preferably, as an ointment. The preferred concentration is 1–2%. Preferably the emulsion should be neutral or nearly neutral in pH. Any emulsifying agent, many of which are known, suitable for use in the preparation of pharmaceutical emulsions and lotions can be used, but non-ionic emulsifiers, e.g. a polyoxyethylene derivative of sorbitol or mannitol, are preferred.

Any pharmaceutically-acceptable ointment base is also suitable for the practice of this invention. Petroleum jelly is an example of a suitable base. The combination can be dispersed therein by known methods.

Hexetidine is commercially available in a pharmaceutical grade which is suitable for the practice of this invention. P–1483 can be prepared by any known method. A suitable one is as follows: To 38 g. (0.5 mole) of nitroethane, add 75 ml. (1 mole) of 37% formaldehyde solution. Then slowly add 87 g. (1 mole) of morpholine at 70–80° C. with good agitation and continue stirring at that temperature for about an hour. Add about 200 ml. of water, and cool the mixture to about 20° C. in about 30 minutes, thereby crystallizing P–1483, which after drying has a melting point of 124–128° C. It can be used as is in the practice of this invention, or can be purified if desired.

The term dispersed as used herein is intended to include true solutions, colloidal suspension and emulsions. It is not intended that the term dispersions be limited to any particular particle size or method of suspension.

The invention will be better understood with reference to the following examples. It is understood that the examples are intended to be illustrative only and it is not intended that the invention be limited thereby.

EXAMPLE 1

The anti-microbial properties for P–1483 and hexetidine were determined by the tube dilution method. Media for the bacterial cultures was trypticase soya broth at pH 7.3 prepared as known in the art, and the media for the fungi was Sabouraud broth at pH 5.6, also prepared as known in the art. The inoculum was standardized by diluting to 50% light transmission using a spectrometer at a wavelength setting of 660 $\mu$m. The amount of inoculum per tube was 0.035 ml.

The results, expressed as inhibition endpoints in $\mu$g./ml., show that at a 1:1 ratio the combination is more active against many microorganisms than either component alone.

| Organism | 100% P-1483 | 90% P-1483 10% hexetidine | 50% P-1483 50% hexetidine | 10% P-1483 90% hexetidine | hexetidine |
|---|---|---|---|---|---|
| Bacteria: | | | | | |
| Staphylococcus aureus | 100–200 | 5–10 | 1–5 | <1 | 1–5 |
| Streptococcus fecalis | >200 | 5–10 | <1 | <1 | <1 |
| Streptococcus hemolyticus | 100–200 | 5–10 | 1–5 | <1 | <1 |
| Escherichia coli | 75–100 | 75–100 | 100–200 | >200 | >200 |
| Pasteurella pseudotuberculosis | 50–75 | 10–25 | 5–10 | 5–10 | 10–25 |
| Pseudomonas aeruginosa | 50–75 | 50–75 | 50–75 | 75 100 | >200 |
| Shigella dysenteriae | >200 | 1–5 | <1 | <1 | 1–5 |
| Mycobacterium tuberculosis | 50–75 | 5–10 | 1–5 | <1 | <1 |
| Fungi: | | | | | |
| Aspergillus niger | 25–50 | 10–25 | 5–10 | 1–5 | 5–10 |
| Candidia albicans | 5–10 | 1–5 | 1–5 | <1 | 5–10 |
| Penicillium specie | 5–10 | <1 | <1 | <1 | 1–5 |
| Aspergillus fumigatus | 50–100 | 5–10 | 5–10 | 1–5 | 5–10 |

EXAMPLE 2

An ointment containing 1% by weight of a 1:1 mixture of hexetidine and P–1483 was prepared by dispersing 1 g. of the mixture in 99 g. of petrolatum. It is used to treat an

EXAMPLE 3

An ointment containing 5% by weight of a 1:1 mixture of hexetidine and P-1483 is prepared by dispersing 5 g. of the mixture in 95 g. of petrolatum. It is used to treat an animal suffering from an infection by applying it topically to the infected area.

EXAMPLE 4

The hexetidine and P-1483 combination was prepared as about a 11.3% by weight suspension in 5% aqueous methyl cellulose. To determine acute oral toxicity, the suspension, and dilutions thereof, was administered orally by intubation to laboratory mice which had been fasted for 2 hours. All animals were offered food and water *ad libitum* following a single dose and were observed frequently on the day of administration and daily thereafter for 14 days. The $LD_{50}$ was determined to be about 2.0 g./kg.

The suspension is diluted to about 1% by weight and is used to treat an animal suffering from an infection by applying it topically to the infected area.

What is claimed is:

1. A combination suitable for treating skin infections of bacterial or fungal origin consisting essentially of hexetidine and 2-methyl-2-nitro-1,3-dimorpholinopropane in a ratio of about 1:1 by weight at a concentration of 0.5–5% in an emulsion, lotion or ointment base.

2. A method of treating infections of the skin of animals suffering from an infection caused by bacterial or fungal microorganisms susceptible to the combination of claim 1 by applying to said infection a lotion, cream or ointment having dispersed therein from 0.5–5% of the combination of claim 1.

3. The method of claim 2 wherein from 1–2% of said combination is dispersed in said lotion, cream or ointment.

References Cited

UNITED STATES PATENTS

| | | | |
|---|---|---|---|
| 2,837,463 | 6/1958 | Fosdick et al. | 424—251 |
| 3,072,529 | 1/1963 | Sanders et al. | 424—251 |

OTHER REFERENCES

Chemical Abstracts, 58:7774e (1963).
Chemical Abstracts, 60:764f (1964).
Chemical Abstracts, 63:5432a (1965).

JEROME D. GOLDBERG, Primary Examiner

U.S. Cl. X.R.

424—251

PO-1050
(5/69)

UNITED STATES PATENT OFFICE
CERTIFICATE OF CORRECTION

Patent No. 3,836,654                    Dated September 17, 1974

Inventor(s) Edward B. Hodge

It is certified that error appears in the above-identified patent and that said Letters Patent are hereby corrected as shown below:

Column 1, line 13, "hexahydropyyrimidine" should read --hexahydropyrimidine--.

Column 2, in the table, last column of the table, "hexetidine" should read --100% hexetidine--.

Signed and sealed this 6th day of May 1975.

(SEAL)
Attest:

RUTH C. MASON
Attesting Officer

C. MARSHALL DANN
Commissioner of Patents
and Trademarks